United States Patent [19]

Tauster et al.

[11] Patent Number: 5,139,992
[45] Date of Patent: Aug. 18, 1992

[54] THREE-WAY CONVERSION CATALYST INCLUDING A CERIA-CONTAINING ZIRCONIA SUPPORT

[75] Inventors: Samuel J. Tauster, Englishtown; Harold N. Rabinowitz, Upper Montclair; Joseph C. Dettling, Howell, all of N.J.

[73] Assignee: Engelhard Corporation, Iselin, N.J.

[21] Appl. No.: 602,887

[22] Filed: Oct. 23, 1990

Related U.S. Application Data

[63] Continuation of Ser. No. 435,017, Nov. 8, 1989, abandoned.

[51] Int. Cl.$^5$ .............. B01J 21/04; B01J 21/06; B01J 23/10; B01J 23/42; B01J 23/46
[52] U.S. Cl. .................... 502/304; 423/213.5
[58] Field of Search ............ 502/304; 423/213.5

[56] References Cited

U.S. PATENT DOCUMENTS 4,587,231 5/1986 Sawamura et al. ............... 502/304
4,868,148 9/1989 Henk et al. ........................ 502/303

FOREIGN PATENT DOCUMENTS 0272136 6/1988 European Pat. Off. ......... 423/213.5

Primary Examiner—W. J. Shine

[57] ABSTRACT

A catalyst composition includes a zirconia support on which is dispersed a limited amount of ceria to provide a zirconia/dispersed ceria support, and a rhodium catalytic component. The ceria content of the zirconia support does not exceed about fifteen percent by weight based on the combined weight of ceria plus zirconia. The resultant catalyst composition enhances the efficiency of three-way conversion catalyst systems in which it is employed, possibly by promoting the water gas shift reaction and the steam reforming of hydrocarbon. The rhodium on zirconia/dispersed ceria support may be combined with a catalytically effective amount of a platinum catalytic component to provide an effective three-way conversion catalyst.

12 Claims, No Drawings

THREE-WAY CONVERSION CATALYST INCLUDING A CERIA-CONTAINING ZIRCONIA SUPPORT

"This is a continuation of copending application Ser. No. 07/435,017 filed on Nov. 8, 1989, now abandoned.

BACKGROUND OF THE INVENTION

1. Field Of The Invention

The present invention is concerned with catalysts useful for the treatment of gases to reduce contaminants contained therein. More specifically, the present invention is concerned with improved catalysts which may function as catalysts of the type generally referred to as "three-way conversion" or "TWC" catalysts. TWC catalysts are polyfunctional in that they have the capability of substantially simultaneously catalyzing both oxidation and reduction reactions, such as the oxidation of hydrocarbons and carbon monoxide and the reduction of nitrogen oxides. Such catalysts find utility in a number of fields, including the treatment of the exhaust gases from internal combustion engines, such as automobile and other gasoline-fueled engines.

2. Background and Related Art

General Background

In order to meet governmental emissions standards for unburned hydrocarbons, carbon monoxide and nitrogen oxide contaminants in vehicle and other engine exhaust gases, so-called catalytic converters containing suitable catalysts are emplaced in the exhaust gas line of internal combustion engines to promote the oxidation of unburned hydrocarbons ("HC") and carbon monoxide ("CO") and the reduction of nitrogen oxides ("$NO_x$") in the exhaust gas. Two separate catalyst members or beds can be used in series, the first to promote reduction of $NO_x$ and the second to promote oxidation of HC and CO, with optional oxygen (air) introduction between the beds. Alternatively, a single bed TWC catalyst, which substantially simultaneously promotes both oxidation and reduction as described above, may be used, provided that the air-to-fuel weight ratio of the engine whose exhaust is being treated is held close to the stoichiometric ratio. For the foregoing purpose, catalysts comprising one or more platinum group metals and, optionally, base metal oxides distended upon a high surface area, refractory oxide support are well known in the art. The support may comprise a high surface area alumina coating carried on any suitable carrier such as a refractory ceramic or metal honeycomb structure, as well known in the art. For example, see C. D. Keith et al U.S. Pat. No. 4,552,732. Such high surface area alumina materials, generally referred to in the art as "gamma alumina" or "activated alumina", typically exhibit a BET surface area in excess of 60 square meters per gram ("$m^2/g$"), often up to about 200 $m^2/g$ or more. Such activated alumina is usually a mixture of the gamma and delta phases of alumina, but may also contain substantial amounts of eta, kappa and theta alumina phases. It is a known expedient in the art to stabilize such activated alumina supports against thermal degradation by the use of materials such as zirconia, titania, alkaline earth metal oxides such as baria, calcia or strontia or, most usually, rare earth metal oxides, for example, ceria, lanthana and mixtures of two or more rare earth metal oxides. For example, see C. D. Keith et al U.S. Pat. No. 4,171,288.

It is also known that bulk ceria may serve as a support for platinum group metal catalytic components and that the ceria may be stabilized against thermal degradation by impregnation with a solution of an aluminum compound, followed by calcination. For example, see U.S. Pat. No. 4,714,694 of C. Z. Wan et al, which discloses aluminum-stabilized bulk ceria, optionally combined with an activated alumina, to serve as a refractory oxide support for platinum group metal components impregnated thereon. See also U.S. Pat. No. 4,708,946 of Ohata et al, which discloses a three-way conversion catalyst comprising an alumina-modified cerium oxide material and at least one precious metal selected from the group consisting of platinum, palladium and rhodium, together with activated alumina.

The art shows an awareness that although particulate cerium oxide (ceria) provides an excellent refractory oxide support for the other platinum group metals, a deleterious interaction occurs between rhodium and ceria under certain conditions of use of the catalyst. When used as a support for platinum, for example, the ceria enables the attainment of highly dispersed, small crystallites of platinum on the ceria support material and the use of bulk ceria as a catalyst support for platinum group metal catalysts other than rhodium, is disclosed in U.S. Pat. 4,727,052 of C. Z. Wan et al. As described at column 5, lines 1–36 of this patent, rhodium tends to react with rare earth metal oxides, including ceria, especially under high temperature conditions, which has a deleterious effect on catalyst activity. In this regard, see also U.S. Pat. No. 4,678,770 of C. Z. Wan et al, the disclosure of which is hereby incorporated herein.

Zirconia-Supported Catalysts

U.S. Pat. No. 4,233,189 of Gandhi et al discloses (column 1, line 48 et seq.) a catalyst system which includes a zirconia washcoat (support material) disposed on a suitable substrate and having rhodium metal, alone or with another catalyst metal, dispersed on the zironia washcoat. As discussed starting at column 2, line 25 of the Patent, zirconia has a lower surface area as compared to gamma alumina, but the amount of rhodium which dissolves into the washcoat material is substantially reduced as compared to the use of gamma alumina as a support. The patentee also contends that the need for a higher surface area (alumina) washcoat may not be as critical in view of the generally reduced lead and phosphorus contents of contemporary gasolines as compared to earlier years. The patentee also discloses, beginning at line 47 of column 2, that substrates of the generally known type may be used, including monolithic ceramic substrates.

U.S. Pat. No. 4,299,734 of Fujitani et al discloses a three-way conversion catalyst comprising platinum and palladium or mixtures thereof supported on a sintered, porous zirconia carrier which contains, per liter of carrier, from about 1 to 80 grams of at least one of cerium oxide, manganese oxide and iron oxide (column 1, lines 49–57 and column 2, lines 17–24). The patentee also states at column 2, lines 12–16, that the presence of such oxides results in the catalyst having a much higher purifying activity than would be the case in the absence of such oxides. At column 2, lines 39–64, impregnation of the sintered zirconia carrier with a solution of a salt of cerium, manganese or iron is disclosed as one technique for making the catalyst. At lines 57–64 of column 2, an alternate manufacturing technique is disclosed in which a zirconia powder is mixed with an oxide powder containing at least one of cerium oxide, manganese oxide or iron oxide powder, and the mixed powders are sintered. When sintering the mixed zirconia and oxide powders (e.g., cerium oxide powder), about 1 to 5 percent by weight of alumina is added as a binder (column 2, line 65 to column 3, line 2). Platinum or palladium catalytic components or both dispersed on a ceria-impregnated zirconia carrier are shown in Table 2 of the Fujitani Patent.

As indicated by the above discussion, the art shows an awareness of the utilization in a catalyst composition of ceria-impregnated zirconia to serve as a support for platinum and palladium catalytic components (U.S. Pat. No. 4,299,734) and the use of zirconia as a support for a rhodium catalytic component (U.S. Pat. No. 4,233,189). However, the use of rhodium on a ceria support is discouraged (U.S. Pat. Nos. 4,727,052 and 4,678,770) despite suggestions to the contrary (U.S. Pat. No. 4,708,946).

SUMMARY OF THE INVENTION

In accordance with the present invention, there is provided a catalyst composition comprising a carrier on which is disposed a catalytic material comprising a zirconia support having thereon from about 0.1 to 15 percent by weight ceria, for example, from about 0.5 to 15 percent or from about 2 to 13 percent, by weight ceria calculated as $CeO_2$ and based on the weight of ceria plus zirconia, and a catalytically effective amount of a first rhodium catalytic component dispersed on the zirconia support.

In another aspect of the invention, the catalytic material also contains a catalytically effective amount of a platinum catalytic component, for example, a platinum catalytic component dispersed on a first activated alumina support.

In another aspect of the present invention, the catalyst composition may further include a second rhodium catalytic component dispersed on a second alumina support.

Yet another aspect of the present invention provides a catalyst composition as described above and further in including (i) an activated alumina support comprising (i) a first alumina support which is substantially free of rare earth oxides, e.g., ceria, and has a first portion of the platinum catalytic component dispersed thereon, and (ii) an aluminastabilized ceria support which has a second portion of the platinum catalytic component dispersed thereon.

In yet another aspect of the present invention, there is provided a catalyst composition wherein the activated alumina support comprises, in addition to the above-described first alumina support, a second alumina support which is substantially free of stabilizing ceria and has a second rhodium catalytic component dispersed thereon.

Still another aspect of the present invention provides a catalyst composition as described above wherein the catalytic material further comprises a minor amount of a high-porosity refractory metal oxide which has a greater porosity than either of the activated alumina supports or the zirconia support. Consequently, the high-porosity refractory metal oxide, for example, pulverized cordierite increases the porosity of the catalytic material relative to what it would be if the high-porosity material were not present. As used herein and in the claims, a "minor" amount of the high-porosity refractory metal oxide means that the high-porosity refractory metal oxide comprises less than fifty percent by weight of the combined weight of the high-porosity refractory metal oxide and the refractory metal oxide supports (excluding the weight of catalytic components, such as platinum and rhodium) dispersed thereon. Usually the high-porosity refractory metal oxide will comprise only about 1 to 20 percent by weight, e.g., 5 to 10 percent by weight of the combined refractory metal oxides, on the same basis as above indicated.

Generally, the present invention provides a bulk, i.e., particulate or solid zirconia support, onto which a soluble cerium salt is impregnated so that, upon calcination, a limited amount of ceria is dispersed into the zirconia body or particles.

Other aspects of the present invention are described in the following detailed description of the invention.

As used herein and in the claims, reference to a "catalytic component" means and includes catalytically effective forms of the component and precursors thereof, such as the elemental metal, an oxide or other compound or a complex of the metal, or an alloy or mixture including the metal, or a combination of any of the foregoing. For example, reference to a "platinum catalytic component" means a catalytically effective form of platinum or a precursor thereof, such as elemental platinum metal, an oxide, some other platinum compound or complex, or an alloy or mixture including platinum, or a combination of any of the foregoing.

DETAILED DESCRIPTION OF THE INVENTION AND SPECIFIC EMBODIMENTS THEREOF

As indicated by the above discussion under the heading Background Of The Invention, the substantially simultaneous conversion of pollutants which must be oxidized (HC and CO) and pollutants which must be reduced ($NO_x$) complicates attempts to eliminate or reduce all three components in an exhaust gas being treated with a catalytic converter. The art is aware that certain components of a catalytic composition have greater effectiveness for one class of pollutants or another depending upon conditions such as the composition and temperature of the gas stream being treated.

The utilization of rhodium as a component of a catalyst composition is known to be effective for promoting the reduction of $NO_x$. It has now been discovered that by utilizing in a catalytic composition a rhodium catalytic component dispersed upon a ceria-impregnated zirconia support, a catalyst of enhanced efficacy for TWC operation, i.e., for substantially simultaneous conversion of HC, CO and $NO_x$, is attained. As used herein and in the claims, "conversion" of these pollutants means their conversion to innocuous substances such as $N_2$, $H_2O$ and $CO_2$. The rhodium on ceria-impregnated zirconia is believed to promote both a water gas shift reaction, thereby promoting the oxidation of CO to carbon dioxide, as well as a steam reforming reaction which promotes the reaction of saturated hydrocarbons (HC) with $H_2O$, to form hydrogen and carbon oxides.

As pointed out above in the discussion of related art, there are teachings in the art that rhodium should not be utilized in TWC catalysts or the like in contact with rare earth metal oxides such as ceria, because of undesirable reaction between the rhodium and ceria, especially when lean (oxygen rich) conditions exist in the exhaust gas being treated. However, in the present case, the amount of ceria impregnated into the zirconia used is limited to not more than about 15 percent by weight, preferably not more than about 10 percent by weight ceria, expressed as the combined weight of the ceria and zirconia. By thus controlling the amount of ceria dispersed on the zirconia, it has been found that the adverse reaction between rhodium and ceria does not occur to any significant extent. Further, the presence of the ceria is believed to assist in retaining the rhodium crystallites in place on the zirconia support and in preventing or retarding sintering of the rhodium to form crystallites of undesirably large size. The controlled amount of ceria dispersed on the zirconia in accordance with the teachings of the present invention serves to stabilize the zirconia against sintering of the rhodium and, as indicated above, is believed to promote steam reforming and water gas shift reactions, thereby enhancing efficiency of the catalyst. Thus, in the catalysts of the present invention, the rhodium catalytic component is dispersed on a ceria-impregnated zirconia support containing a limited amount of ceria, (not more than 15 percent by weight ceria based on the weight of ceria and zirconia) to provide a zirconia/dispersed ceria support which enhances the stability of the catalyst by reducing or eliminating the tendency of the rhodium crystallites to sinter. Although not wishing to be bound thereby, it is believed that the rhodium on zirconia/dispersed ceria support also enhances the efficiency of the consumption of both hydrocarbons and carbon monoxide in the gaseous stream being treated.

One specific embodiment of the present invention provides that the catalyst composition also contains a second rhodium catalytic component supported conventionally on an alumina support, in order to maintain good activity for $NO_x$ reduction.

The catalyst compositions of the present invention may also contain other catalytic components utilized for their known properties. Thus, the catalyst compositions may also contain a platinum catalytic component dispersed upon an activated alumina support. This component results in relatively large platinum crystallites being dispersed on the surface of the activated alumina and provides a catalytic component which is believed to have good efficiency for the oxidation of saturated hydrocarbons.

A second platinum catalytic component dispersed on ceria, such as an alumina-stabilized cerium oxide support, as disclosed in the above-mentioned U.S. Pat. No. 4,714,694, may also be included in the composition. This catalytic component is believed to disperse the platinum as relatively small crystallites on the surface of the alumina stabilized ceria, thereby providing a catalytic component which is believed to have good efficiency for the oxidation of carbon monoxide and unsaturated hydrocarbons to carbon dioxide and $H_2O$.

The catalyst composition of the present invention also preferably contains a high-porosity refractory metal oxide which increases the over-all porosity of the catalytic material, as disclosed in U.S. Pat. No. 4,757,045 of M. E. Turner et al, the disclosure of which is hereby incorporated herein. For example, the catalytic material ("washcoat") may comprise a support including zirconia having a dispersed ceria phase thereon and an activated alumina support. The washcoat may also contain another refractory metal oxide of higher porosity than the support material, such refractory metal oxide serving to increase the porosity of the wash-coat. The high-porosity refractory metal oxide desirably has an accessible pore volume of greater than about 0.03 cubic centimeters per gram, a surface area of less than about 25 square meters per gram, and a pore size range such that at least about 35% of its pore volume is provided by pores having a diameter of at least 2000 Angstroms when the second metal oxide particles being measured for pore size are at least 44 microns in diameter. Pulverized cordierite is well-suited for the purpose.

The catalyst composition of the present invention may be applied to any suitable substrate, for example, to a ceramic substrate such as a cordierite substrate comprising a plurality of cells which define fine, parallel gas flow passages extending from one face to the other of a cylindrical monolith member. Such substrates, which may also be made of refractory metals such as stainless steel, are sometimes referred to in the art as "honeycomb" or "monolithic" substrates. Alternatively, the catalyst compositions of the present invention may include a washcoat containing the above-described catalytic material dispersed on a particulate support made of a refractory ceramic material, such as pellets, spheres or extrudates of alpha alumina or the like.

When applying the catalytic materials to a monolith substrate, such as a cordierite substrate, it is also preferred to provide an initial undercoat of activated alumina. Activated alumina, when applied and calcined in the manner as described in the following examples, provides a tough, adherent coating to the cordierite or other substrate. The catalyst materials are then applied as a second or topcoat over the undercoat. This not only provides better adherence of the catalytic material to the substrate but, by supporting the topcoat on an undercoat consisting essentially of activated alumina, the metal catalytic components such as platinum and rhodium are made more accessible to the gas flowing through the cells of the substrate. That is, the gas can flow through the topcoat layer and into the undercoat, thereby providing enhanced passage and increased contact of the noxious components with the catalytic metals dispersed throughout the topcoat. The activated alumina undercoat may optionally be stabilized by a suitable thermal stabilizer such as ceria and/or other rare earth oxides and the topcoat may include a second, porous refractory metal oxide to enhance gas flow therethrough.

Specific embodiments of the invention and utilization thereof in comparison to a comparative composition are shown in the following Examples 1–3.

EXAMPLE 1

A catalyst in accordance with an embodiment of the present invention having an undercoat adhered to a substrate and a catalytic topcoat applied thereto is denominated Catalyst I and is prepared as follows.

I. The Undercoat

A. The undercoat is prepared by impregnating an activated alumina powder with an aqueous solution of cerium nitrate, then spray-drying the impregnated powder in air at 400° F. (204° C.) and calcining the dried powder in air at 900° C. The resultant material contained 5% by weight cerium oxide (as $CeO_2$) as a thermal stabilizer for the alumina and had a surface area of about 130 square meters per gram ("$m^2/g$"). This ceria-stabilized, activated alumina frit was then coated onto a monolith substrate to give a loading of 1.5 grams per cubic inch ("g/in3") of ceria-stabilized alumina. The substrate was a cordierite honeycomb support manufactured by Corning Glass Works and having 400 cells per square inch (62 cells per square centimeter) of face area extending therethrough, the cells being of substantially square cross section. The substrate was oval in cross section, measured 7.19 centimeters in length and its faces measured 8.4 by 14.8 centimeters. The ceria-stabilized alumina was applied by dipping the substrate into an aqueous slurry of the stabilized aluminassolids. Excess slurry was blown from the cells with compressed air, and the thus-coated substrates were dried and then calcined in air at 500° C. for one hour.

II. The Topcoat

B. One component of the topcoat is prepared by impregnating an activated alumina powder having a surface area of 130 m$^2$/g with an aqueous solution of a methylethanolamine complex of Pt+$^4$ hydroxide, whose formula may be expressed informally as (MEA)2Pt(OH)6, wherein MEA represent methylethanolamine. The complex solution is of a concentration to give the platinum metal loading described below. The platinum compound-impregnated activated alumina is milled in a ball mill in the presence of acetic acid to chemically fix the platinum on the alumina support, providing a first alumina support having a platinum catalytic component dispersed thereon in the amount of 1.93 weight percent, measured as platinum metal and based on the weight of the platinum plus the alumina support. This first alumina support is not thermally stabilized, that is, it is substantially free of stabilizing ceria and other known thermal stabilizers such as rare earth metal oxides generally.

C. A second platinum-containing component is supported on an alumina-stabilized bulk ceria which is prepared by impregnating a cerium oxide powder with an aqueous solution of aluminum nitrate. The impregnated cerium oxide powder is then dried in air at 125° C. and then calcined in air at about 400° C. to give a ceria support having 2.5 weight percent alumina (measured as Al$_2$O$_3$) on ceria. This alumina-stabilized ceria support is then impregnated with a platinum catalytic component and fixed, using the same solution and technique as in Step B, to provide on the ceria support an identical loading of 1.93 weight percent platinum catalytic component, measured as platinum metal and based on the weight of platinum plus the alumina support.

D. A second alumina support having a rhodium catalytic component dispersed thereon is prepared by impregnating an activated alumina powder having a surface area of 130 m$^2$/g with an aqueous solution of rhodium nitrate of a concentration to give the rhodium catalytic component loading described below. The impregnated alumina is dried in air at 125° C., then calcined in air at 450° C. to thermally fix the rhodium on the support and give an alumina support which is substantially free of ceria (or other stabilizing compounds) and contains thereon 0.39 weight percent rhodium, measured as the metal and based on the weight of rhodium plus the alumina support.

E. A zirconia/dispersed ceria phase support is prepared by impregnating a commercially available zirconia powder with an aqueous solution of cerium nitrate, Ce(NO$_3$)$_3$ of a concentration to give the ceria loading described below. The impregnated zirconia support is dried in air at 125° C. and then calcined in air at 450° C. The resultant zirconia support material contains 10 percent by weight cerium oxide measured as CeO$_2$ and based on the weight of zirconia plus ceria. This support is impregnated with an aqueous solution of rhodium nitrate of a concentration to give the rhodium loading described below. The impregnated zirconia support is dried in air at 125° C. and the dried support is calcined in air at 450° C. to provide a zirconia/dispersed ceria support having thereon 0.39 weight percent rhodium, measured as the metal and based on the weight of rhodium plus the zirconia support.

F. A cordierite powder was prepared by comminuting cordierite substrate scrap material.

G. Each of the five topcoat components of Steps B through F are milled separately in ball mills in aqueous media to a particle size range such that at least 90% by weight of the particles are of a diameter less than 12 microns. The milled powders slurries are then blended together in proportions to provide a coating slip.

H. The cordierite substrates having the undercoat affixed thereto, obtained in Step A, are dipped into the coating slip of Step G and excess slurry is blown from the cells of the substrates with compressed air. The thus-coated substrates are dried in air at 125° C. and then calcined in air at 450° C. for one hour to provide a catalyst composition containing a topcoat and an undercoat of dried, adherent catalytic material ("washcoat") thereon. The finished catalyst composition of Example 1 comprises 0.70 g/in$^3$ of platinum-containing alumina-stabilized ceria support, 0.30 g/in$^3$ of platinum-containing alumina support, 0.50 g/in$^3$ of rhodium-containing alumina support, 0.50 g/in$^3$ of rhodium-containing zirconia/dispersed ceria support, and 0.20 g/in$^3$ of ground cordierite.

COMPARATIVE EXAMPLE 2

A comparative catalyst denominated Catalyst II is identical to Catalyst I of Example 1, except that the rhodium on zirconia/dispersed ceria phase support of Step E of Example 1 is replaced by rhodium supported on a zirconia-stabilized ceria support, prepared as follows. A zirconia-stabilized ceria support having a rhodium catalytic component dispersed thereon is prepared by impregnating a commercially available cerium oxide powder with an aqueous solution of zirconyl nitrate ZrO(NO$_3$)$_2$, at a concentration to give the zirconia loading described below. The impregnated zirconia powder is dried in air at 125° C., then calcined in air at about 400° C. to give a zirconia-stabilized ceria support material containing 2.5 weight percent zirconia, measured as ZrO$_2$. This support material is then impregnated with a rhodium solution and thermally fixed exactly as described in Step D of Example 1 above, to provide a zirconia-stabilized ceria support containing thereon 0.39 weight percent of rhodium catalytic component, measured as rhodium metal.

The finished catalyst composition of Example 2 comprises 0.70 g/in$^3$ of platinum-containing alumina-stabilized ceria support, 0.30 g/in$^3$ of platinum-containing alumina support, 0.50 g/in$^3$ of rhodium-containing alumina support, 0.50 g/in$^3$ of rhodium-containing zirconia dispersed ceria support, and 0.20 g/in$^3$ of ground cordierite.

Both Catalyst I of Example 1 and Catalyst II of Example 2 contain a total of 40 g/ft$^3$ of precious metal (platinum and rhodium), with a Pt to Rh weight ratio (as the metal) of 5.0.

EXAMPLE 3

Catalyst I of Example 1 and Comparative Catalyst II of i5 Example 2 were engine-aged for 24 hours on a standardized four-hour aging cycle in which engine exhaust gas from an engine operating with a gasoline containing 12 milligrams Pb per gallon is flowed through the catalyst. The engine is operated at idle, high and cruise conditions including selected air-to-fuel ratios and varying temperatures up to a maximum temperature of about 760° to 815° C. Each was then evaluated on a Volvo 740 GLE automobile equipped with a four cylinder engine using the Federal Test Procedure as prescribed in Part 86 of 40 Code of Federal Regulations (40 CFR 86). The Federal Test Procedure results, expressed as total grams per mile of CO, hydrocarbon (HC) and $NO_x$ emissions escaping from the catalyst, are shown below.

|  | HC | CO | $NO_x$ |
| --- | --- | --- | --- |
| Catalyst I | 0.275 | 2.47 | 0.285 |
| Catalyst II | 0.39 | 3.10 | 0.30 |

These results show that Catalyst I, a catalyst in accordance with the present invention, provided significantly better results for all three categories of pollutants than did an otherwise identical catalyst which had an equal amount of rhodium dispersed on a zirconia-impregnated ceria support, instead of on a zirconia/dispersed ceria phase support.

EXAMPLE 4

A catalyst denominated Catalyst III is a single-coat catalyst supported on the same type of a cordierite substrate as used in Example I (see Part A of Example 1). Catalyst III is made as follows.

A. An activated alumina powder, calcined at 950° C. for 2 hours and exhibiting a surface area of about 120 m²/g, is placed in a one-half gallon ball mill to which is also added 240 milliliters ("ml") of distilled water, and the mixture is milled for 30 minutes at 60 revolutions per minute ("rpm"). An aqueous solution of the same MEA platinum hydroxide complex as used in Part B of Example 1 containing 3.675 grams of platinum, measured as the metal, was added to the ball mill and milling was continued for 60 additional minutes. At that time 12.5 ml of a 69 percent nitric acid solution was added to the ball mill and the milling was continued to reduce the particles to a particle size of less than 12 microns in diameter, to provide an aqueous slurry of alumina particles containing, on a dry basis, 1.47 percent by weight platinum, measured as the metal and based on the weight of platinum plus the alumina support.

B. A rhodium on alumina catalytic material is prepared by placing 250 grams of the same alumina powder as used in Step A into a half-gallon ball mill and adding 250 ml distilled water, then milling the resultant aqueous slurry for 30 minutes at 60 rpm. An aqueous solution of rhodium nitrate containing 1.64 grams of rhodium, measured as the metal, was then added to the ball mill and milling continued for 60 additional minutes. After that time, 12.5 ml of a 69 percent nitric acid solution was added to the mill, and milling was continued to reduce the particles to a particle size of less than 12 microns in diameter to provide a slurry of alumina particles which contain thereon, on a dry basis, 0.656 weight percent rhodium, measured as the metal and based on the weight of rhodium plus the alumina support.

C. Into a one-half gallon ball mill there was placed 250 grams of a ceria powder which had been stabilized with alumina, the powder containing on a dry basis 2.5 percent $Al_2O_3$ based on the total weight of ceria plus alumina. To the ball mill was added 240 ml of distilled water and the mixture was milled for 30 minutes at 60 rpm. A portion of the same aqueous MEA platinum hydroxide complex used in Part B of Example 1 and containing 3.675 grams of platinum, measured as the metal, was then added and milling was continued for 60 additional minutes. After that time, 12.5 ml of a 99 percent solution of acetic acid was added to the mill and milling was continued to reduce the particles to a size of less than 12 microns in diameter. The resultant slurry contained alumina stabilized ceria particles containing, in a dry basis, 1.47 percent by weight platinum, measured as the metal and based on the weight of platinum plus the ceria support.

D. The three slurries obtained in Steps A, B and C were blended to provide a coating slip containing, on a dry solids basis, 45 grams of the 0.656 percent rhodium on alumina, 31 grams of the 1.47 percent platinum on alumina, and 70 grams of the 1.47 percent platinum on alumina-stabilized ceria. The same type of cordierite substrates as used in Example 1 (see Part A thereof) were coated with the blended coating slip. The substrates were dipped into the blended slurry and excess slurry was blown from the cells (passageways). The coated substrates were then dried in air at 100° C. for 16 hours and then calcined in air at 450° C. for 1 hour to provide a substrate containing about 1.91 grams per cubic inch of the dried and calcined coating slip (the "washcoat"). The catalyst therefore contained about 9.0 grams of catalytic metal-containing ceria and 1.01 grams of catalytic metal-containing alumina per cubic inch of catalyst. The result is a Catalyst III comprising platinum supported on alumina-stabilized ceria, platinum supported on alumina, and rhodium supported on alumina. Catalyst III contains 40 g/ft³ of precious metal (platinum and rhodium) with a Pt to Rh weight ratio (as metal) of 5.0.

E. A two-stage catalytic converter, denominated Converter A, was prepared by placing within a suitable canister a Catalyst III monolith positioned in the upstream location, and a Catalyst I monolith of Example 1 positioned in the downstream location. The term "upstream" and "downstream" are used as sensed in the direction of exhaust gas flow through the catalytic converter. That is , the gaseous exhaust stream flows in series first through the "upstream" catalyst (Catalyst III) and then through the "downstream" catalyst (Catalyst I).

F. Converter A was aged for about 300 hours using the same aging cycle referred to in Example 3 above, and then evaluated according to the Federal Test Procedure ("FTP") referred to in Example 3, on a recently developed, not yet commercially available automobile gasoline engine. The FTP results are shown below, compared to a desired target for a catalytic converter for the developmental engine.

|  | Grams in Exhaust, Per Mile | | |
| --- | --- | --- | --- |
|  | HC | CO | $NO_x$ |
| Converter A | 0.197 | 1.29 | 0.14 |
| Target | 0.287 | 2.38 | 0.28 |

The data show that results were achieved by Converter A which easily met the target requirements in every category.

While the invention has been described in detail with respect to specific preferred embodiments thereof, it will be apparent to those skilled in the art upon a reading and understanding of the foregoing, that variations thereto may be made which variations nonetheless lie within the spirit and scope of the invention and the appended claims.

What is claimed is:

1. A catalyst composition comprising a carrier on which is disposed a catalytic material comprising: a zirconia support having thereon from about 0.1 to 15 percent by weight ceria, calculated as $CeO_2$ and based on the combined weight of zirconia and ceria; a catalytically effective amount of a first rhodium catalytic component dispersed on the zirconia support; and a second rhodium catalytic component dispersed on a second activated alumina support.

2. The catalyst composition of claim 1 wherein the zirconia support contains from about 0.5 to 15 percent by weight ceria.

3. The catalyst composition of claim 1 wherein the zirconia support contains from about 2 to 13 percent by weight ceria.

4. The catalyst composition of claim 1 further including a catalytically effective amount of a platinum catalytic component dispersed on a first activated alumina support.

5. The catalyst composition of claim 4 wherein the catalytic material further comprises a minor amount of a high-porosity refractory metal oxide which has a greater porosity than any of the first activated alumina support, the second activated alumina support or the zirconia support, and thereby increases the porosity of the catalytic material relative to what it would be if the high-porosity refractory metal oxide were not present.

6. The catalyst composition of claim 1 or claim 2 wherein the catalytic material comprises (i) a second activated alumina support which is substantially free of rare earth oxides and has a first portion of a platinum catalytic component dispersed thereon, and (ii) an alumina-stabilized ceria support which has a second portion of the platinum catalytic component dispersed thereon.

7. The catalyst composition of claim 6 wherein the second activated alumina support is substantially free of rare earth oxides.

8. The catalyst composition of claim 6 wherein the catalytic material comprises a topcoat overlying an undercoat adhered to the carrier, the undercoat comprising a stabilized alumina support.

9. The catalyst composition of claim 8 wherein the undercoat comprises a ceria-stabilized alumina support.

10. A catalyst composition comprising a carrier on which is disposed a catalytic material comprising: (a) a zirconia/dispersed ceria phase support containing from about 0.5 to 15 percent by weight ceria, calculated as $CeO_2$ and having a first rhodium catalytic component dispersed thereon, (b) a first activated activated alumina support which is substantially free of rare earth metal oxides and contains a first platinum catalytic component thereon, (c) an alumina-stabilized ceria support containing a platinum catalytic component thereon, and (d) a second activated alumina support which is substantially free of rare earth metal oxides and contains a second rhodium catalytic component thereon.

11. The catalyst composition of claim 12 wherein the catalytic material further includes a minor amount of a high-porosity refractory metal oxide which has a greater porosity than either of the first and second activated alumina supports or the zirconia support and thereby increases the porosity of the catalytic material relative to what it would be if the high porosity refractory metal oxide were not present.

12. The catalyst composition of claim 10 or claim 11 wherein the catalytic material comprises a topcoat overlying an undercoat comprising a stabilized alumina support.

* * * * *